United States Patent [19]

Desrochers

[11] Patent Number: 4,969,206

[45] Date of Patent: Nov. 6, 1990

[54] PORTABLE DATA COLLECTION DEVICE WITH RF TRANSMISSION

[75] Inventor: Franklin J. Desrochers, Clarkston, Mich.

[73] Assignee: Phyle Industries Limited, Clarkston, Mich.

[21] Appl. No.: 381,581

[22] Filed: Jul. 18, 1989

[51] Int. Cl.⁵ .............................................. H04B 1/38
[52] U.S. Cl. ........................................ 455/89; 455/90; 455/348; 455/351; 429/1; 429/9
[58] Field of Search ........................... 455/89–90, 455/127, 128, 343, 348, 344; 429/1, 9, 96, 99–100, 121–123, 158–159; 320/25, 3, 7; 364/403, 408; 235/385; 340/825.54, 529; 368/1, 10

[56] References Cited

U.S. PATENT DOCUMENTS

| D. 278,059 | 3/1985 | Desrochers | D14/100 |
|---|---|---|---|
| 3,337,992 | 8/1967 | Tolson | 340/529 |
| 3,984,257 | 10/1976 | Zurcher | 429/1 |
| 4,091,187 | 5/1978 | Kaye | 429/159 |
| 4,123,598 | 10/1978 | Hammel | 429/99 |
| 4,269,908 | 5/1981 | Stemme | 429/100 |
| 4,291,106 | 9/1981 | Hooke | 429/1 |
| 4,389,469 | 6/1983 | Nicholls | 429/100 |
| 4,442,318 | 4/1984 | Desrochers | 379/96 |
| 4,530,034 | 7/1985 | Kawarada | 429/123 |
| 4,530,069 | 7/1985 | Desrochers | 364/900 |
| 4,532,194 | 7/1985 | Liautaud et al. | 429/121 |
| 4,534,012 | 8/1985 | Yokozawa | 368/1 |
| 4,653,115 | 3/1987 | Holcomb | 455/127 |
| 4,718,110 | 1/1988 | Schaefer | 455/90 |
| 4,761,823 | 8/1988 | Fier | 455/90 |

Primary Examiner—Reinhard J. Eisenzopf
Assistant Examiner—Andrew Faile
Attorney, Agent, or Firm—Harness, Dickey & Pierce

[57] ABSTRACT

A portable data collection device having RF communication capabilities. This device contains circuit boards arranged in such a manner to shield the CPU board from the RF transmission components. The power source of the device is a battery pack designed to insure the correct electropolarity of the batteries when inserted.

10 Claims, 4 Drawing Sheets

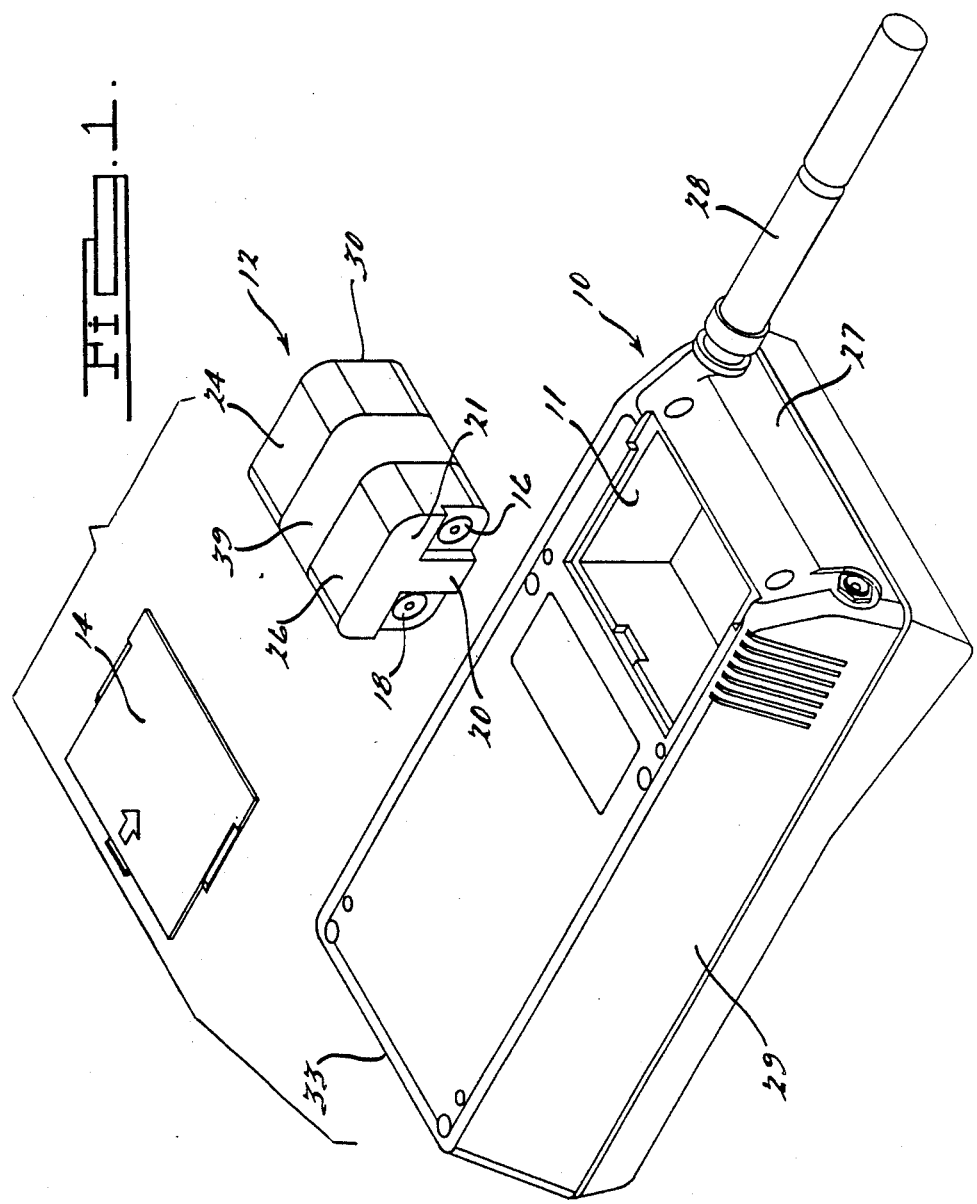

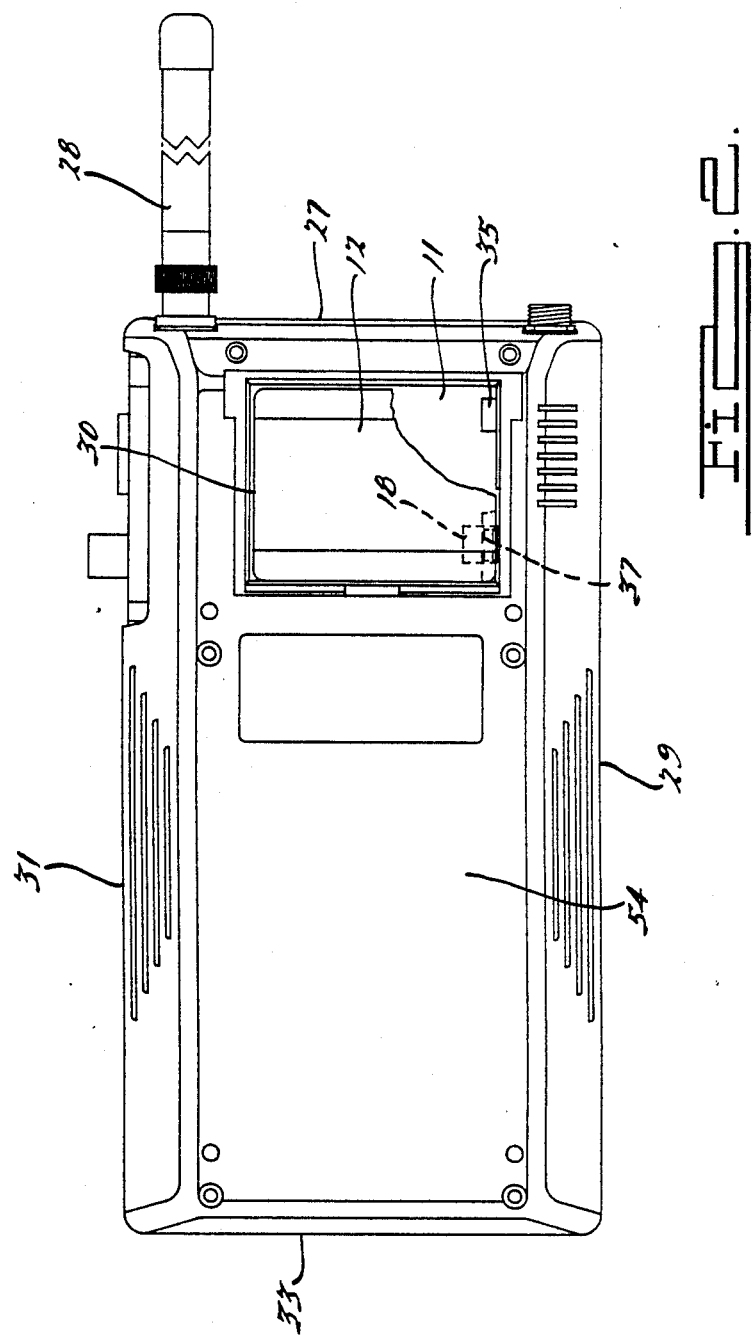

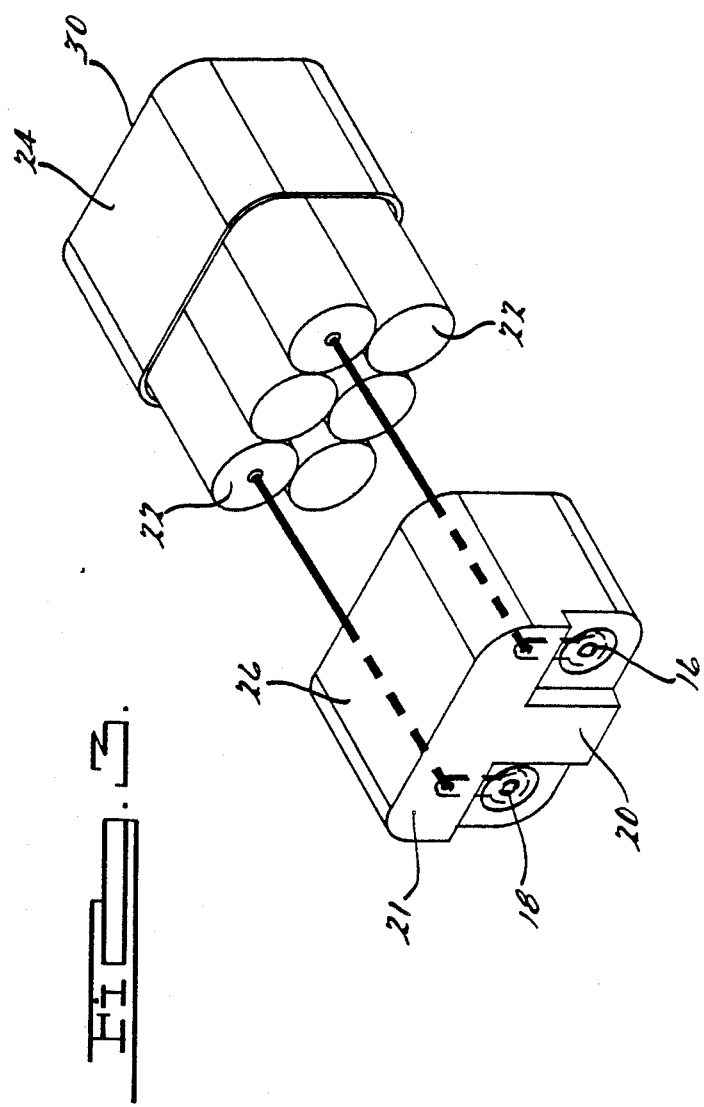

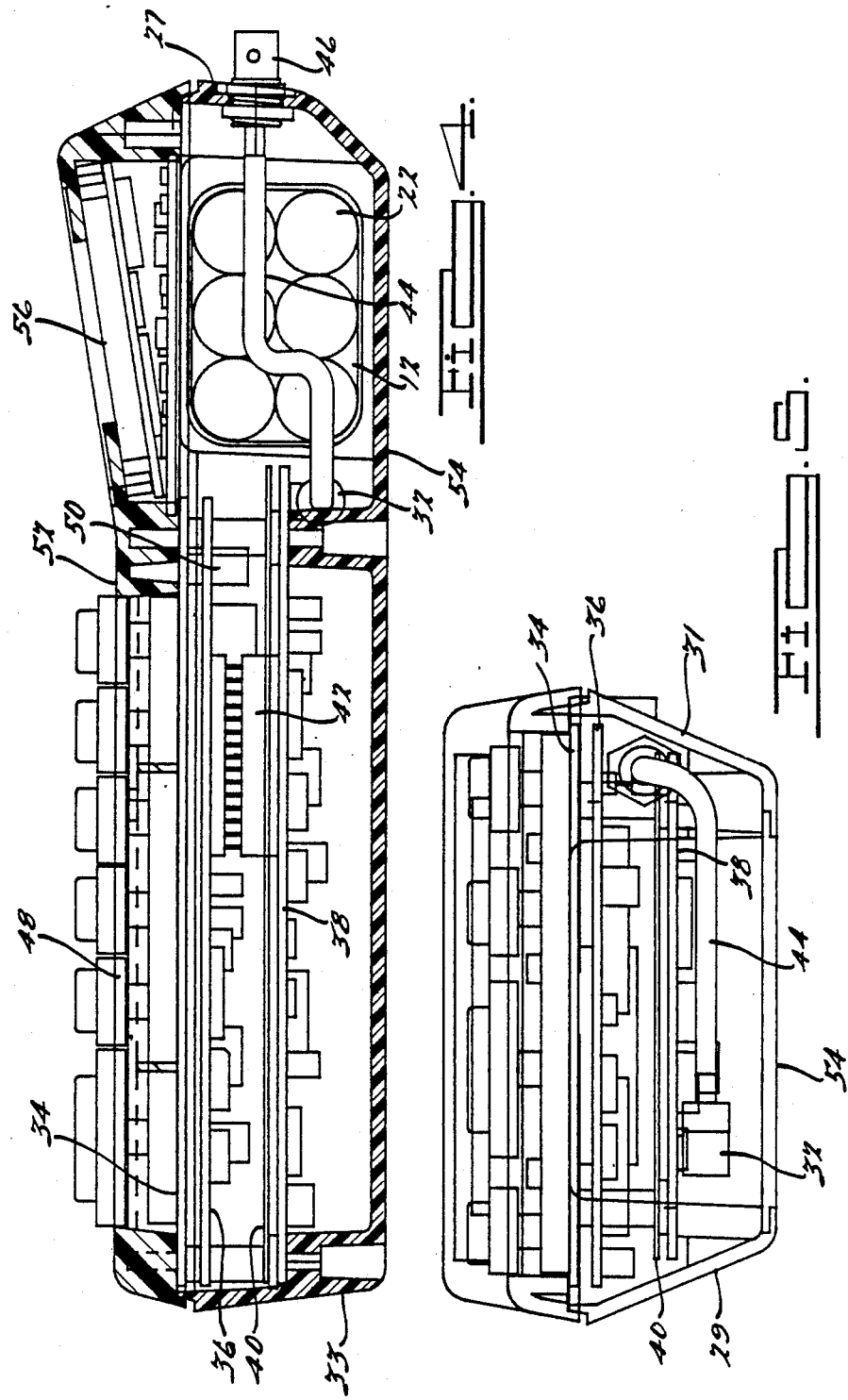

PORTABLE DATA COLLECTION DEVICE WITH RF TRANSMISSION

BACKGROUND OF THE INVENTION

1. Technical Field

This invention relates to data collection devices and, more particularly, to hand held, compact devices having RF transmission capabilities.

2. Discussion

Hand held, data collection devices are used in a wide variety of different applications where data is collected, stored and transmitted. Such devices are often used in taking inventory of grocery items or other similar products. Examples of such devices are found in U.S. Pat. Nos. 4,442,318; 4,530,069 and D278,059. The devices in the above patents generally contemplate the use of hard wired modems to transfer data between the hand held terminal and a remote CPU.

SUMMARY OF THE INVENTION

In accordance with the teachings of the present invention, a hand held data collection device having RF (radio frequency) transmission capabilities is provided. As a result, communication between the portable data collection device and a remote CPU can be accomplished conveniently without requiring wired connections therebetween. In accordance with the teachings of this invention a plurality of circuit boards are stacked in parallel within the housing of the portable data collection device. One of the boards contains RF components and it is shielded from other components within the housing by a metallic sheet. A battery compartment is included in the front of the housing beneath a visual display and a DC voltage source is removably insertable in the battery compartment for providing power to the components. An RF antenna is mounted to the housing for wirelessly transmitting and receiving data. In accordance with the preferred embodiment, a uniquely constructed battery pack is provided to ensure that the batteries are inserted into the compartment with the correct electropolarity. The battery pack includes an end cap with a generally T-shaped end defined by a leg and a cross member. The electrodes are located on opposite sides of the legs. If the battery pack is inadvertently inverted, contacts in the battery compartment abuts the cross member and prevents the battery pack from being inserted.

BRIEF DESCRIPTION 0 THE DRAWINGS

The various advantages of the present invention will become apparent to those skilled in the art after reading the following specification and by reference to the drawings in which:

FIG. 1 is an exploded perspective view of a data collection device made in accordance with the teachings of the present invention;

FIG. 2 is a bottom view of the device with the battery pack inserted into the battery compartment;

FIG. 3 is an exploded perspective view of the battery pack;

FIG. 4 is a longitudinal cross-sectional view taken along the major axis of the housing; and FIG. 5 is a lateral cross-sectional view taken across the minor axis of the housing.

DETAILED DESCRIPTION OF THE PREFERRED EMBODIMENT

Referring now to FIGS. 1-3, the compact portable data collection device 10 contains a rectangular compartment 11 in which the battery pack 12 is normally inserted and a cover 14 which slides into place over the battery pack. The battery pack 12 includes two end caps 24 and 26 which are removably connected together. One end cap 26 has a T-shaped outer surface consisting of a leg 20 and a cross member 21. Electrically polarized electrodes 16 and 18 are located beneath the cross member 21 on opposite sides of the leg 20. When the battery pack 1 is inserted into the compartment 11 and the cover 14 is put into place the bottom surface 54 of the data collection device is substantially smooth. The cover 14 prevents the battery pack 12 from sliding out from the data collection device.

The data collection device itself 10 is a hollow substantially box shaped housing having a front 27, a pair of side walls 29, 31 and a rear wall 33. The major bottom surface 54 contains the battery compartment 11 and battery pack 12. The major top surface 52 contains a keyboard 48 and display 56. The data collection device 10 receives and transmits data through an RF antenna 28 mounted to the front 27 for wireless transmission and reception of data. FIG. 2 shows the back of the data collection device when the battery pack 12 is put into place in compartment 11. The outer surface 30 of end cap 24 is flush against one end surface of the compartment while the electrodes 16 and 18 and the T-shaped outer surface of cap 26 with its leg 20 and cross member 21 are flush against the other end.

Turning to FIG. 3, a number of batteries 22 are inserted in one of the caps 24. These batteries make electrical contact with electrodes 16 and 18 which are installed in the other end cap 26. Electrical contact is created when the two end caps 24 and 26 are put together. The outer surface 30 of end cap 24 is flat. The caps are held together by tape 39 which can be removed to permit replacement of the batteries 22 when necessary. Each end cap 24, 26 covers about half of the longitudinal lengths of the batteries 22.

As shown in FIGS. 4 and 5, the battery pack 12 fits beneath the display 56. Keyboard 48 is connected to the keyboard interface circuit board 34. Signals from this board are transmitted through the keyboard interface connector 50 to the CPU board 36 which is parallel to both the keyboard 48 and the keyboard interface circuit board 34. The operation of the keyboard and the CPU are well understood by those skilled in the art. The CPU board 36 is shielded from the RF components on the RF board 38 by the means of a thin, metal RF sheet serving as shield 40. By way of a typical example, this shield is 0.031 inches thick. The shield has an opening in order to receive an RF interface connector 42 which allows signal communication between the CPU board 36 and the RF board 38. Data is transmitted from and received by the RF board 38 by the means of a cable 44 running from the antenna cable connector 32 to the antenna socket 46 to which the antenna 28 may be attached. By way of a nonlimiting example, the RF board 38 is provided by Electronic Systems Technology of Kennewick, Washington 99336.

In view of the foregoing, several advantages may be appreciated from the present embodiment. The battery pack provides a convenient and portable source of DC voltage for the data collection device. The T-shaped outer surface of end cap 26 insures that the battery pack 12 can only be inserted into the compartment 11 With the correct polarity. If the pack is inserted incorrectly by putting it upside down, the top of the cross member 21 will prevent the battery pack from being inserted and the electrodes from making electrical contact. This is because cross member 21 will abut the spring loaded clips which serve as contacts 35 and 37 for making electrical connection to the electrodes 16 and 18, respectively, of the battery pack 12. Likewise, if the battery pack is inserted incorrectly by putting the outer surfaces of the end caps on the wrong end of the compartment, the battery pack will not make electrical contact. This is because the end cap 24 will again abut the contacts 35 and 37 thereby preventing full insertion of the battery pack 12. Thus, the only way to fully insert the battery pack in the compartment is with the T-shaped end surface on the correct side and orientation in the compartment so that the contacts 35, 37 are located within the relief provided on the sides of leg 20 thereby making electrical contact with the electrodes 16, 18.

The arrangement of parallel boards in the housing along with the metal shield permit effective isolation of the RF components, while maintaining interfaces between the CPU board and the RF board in a compact and efficient manner. In addition, the RF communications capabilities provide the user with ability to wirelessly transmit data to a remote location, as well as to receive instructions for reprogramming the CPU.

Other advantages will become apparent to those skilled in the art after having the benefit of reading the foregoing specification and following claims.

What is claimed is:

1. A compact, portable data collection device having radio frequency (RF) communications capabilities, said device comprising:
    a hollow substantially box-shaped housing having a front, a pair of side walls and a rear wall, as well as major top and bottom surfaces;
    a keyboard for entering data and a display on the top surface;
    a plurality of circuit boards within the housing stacked in parallel to the top surface, one of the boards containing radio frequency (RF) components, another board containing a CPU;
    a metallic sheet lying between the RF circuit board and other boards thereby providing RF shielding therebetween;
    a battery compartment in the housing between the display and bottom surface;
    a battery pack in the compartment for providing power to the components on the circuit boards, said battery pack having a first end cap with a generally T-shaped projection portion defined by a leg and a cross member and a second end cap; and
    an RF antenna mounted to the housing for transmitting said data to a remote source and for receiving instructions for reprogramming the CPU.

2. The device of claim 1 wherein
    the first end cap includes a pair of electrically polarized electrodes on opposite sides of the leg beneath the cross member; and
    the battery compartment has a pair of spaced apart contacts arranged to engage the electrodes when the battery is inserted correctly yet prevent the battery pack from being inserted into the compartment when the electrode polarity is incorrect.

3. The device of claim 2 wherein the battery pack further comprises:
    a plurality of electrically connected cylindrical batteries, substantially half of the longitudinal lengths of the batteries being covered by said first end cap and the second end cap covering an opposite half of the batteries, the first and second end caps being removably coupled together.

4. The device of claim 2 wherein the battery compartment further comprises:
    a hollow substantially boxed shaped area having a front, a pair of side walls and a rear wall, as well as a bottom surface; a corresponding cover which slides into place over said compartment becoming substantially flush with the bottom of said housing.

5. The device of claim 4 wherein one side wall includes spring loaded contacts for making electrical connection with said electrodes on said battery pack.

6. The device of claim 1 wherein the RF antenna is detachable to a socket which is connected to said RF board by the means of a cable running between said compartment and said side and front walls of said housing.

7. The device of claim 1 including an RF circuit board connected to other circuit boards by the means of an RF interface connector which is installed in a hole through said metallic sheet.

8. A removable battery pack, said battery pack comprising:
    a first end cap with a generally T-shaped projection portion defined by a leg and a cross member, the cap including a pair of electrically polarized electrodes on opposite sides of the leg beneath the cross member;
    a second end cap similar to said first end cap but without said T-shaped projection portion;
    a plurality of electrically connected cylindrical batteries, substantially half of the longitudinal lengths of the batteries being covered by first end cap, and the opposite half of said batteries being covered by said second end cap whereby the T-shaped projection prevents said pack from being improperly inserted, thus avoiding electrical contact unless polarity is correct.

9. The battery pack of claim 8 wherein the first and second end caps are removably coupled together and held by a tape which is wrapped around said end caps.

10. The device of claim 1, wherein the metallic sheet is approximately 0.031 inches thick.

* * * * *